(12) United States Patent
Nishikawa et al.

(10) Patent No.: US 9,118,236 B2
(45) Date of Patent: Aug. 25, 2015

(54) MOTOR FOR ELECTRIC POWER STEERING

(75) Inventors: Hideya Nishikawa, Chiyoda-ku (JP);
Isao Sonoda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 191 days.

(21) Appl. No.: 13/816,329

(22) PCT Filed: Nov. 12, 2010

(86) PCT No.: PCT/JP2010/070209
§ 371 (c)(1),
(2), (4) Date: Feb. 11, 2013

(87) PCT Pub. No.: WO2012/063361
PCT Pub. Date: May 18, 2012

(65) Prior Publication Data
US 2013/0134841 A1    May 30, 2013

(51) Int. Cl.
*H02K 5/10* (2006.01)
*H02K 29/12* (2006.01)
*H02K 11/00* (2006.01)
*B62D 5/04* (2006.01)
*H02K 5/22* (2006.01)
*H02K 24/00* (2006.01)

(52) U.S. Cl.
CPC .............. *H02K 29/12* (2013.01); *B62D 5/0406* (2013.01); *H02K 11/0015* (2013.01); *H02K 11/0073* (2013.01); *B62D 5/0403* (2013.01); *H02K 5/10* (2013.01); *H02K 5/225* (2013.01); *H02K 24/00* (2013.01)

(58) Field of Classification Search
CPC .......... H02K 29/12; H02K 5/10; B62D 6/008; B62D 5/0406; B62D 5/0403
USPC ............................................. 310/68 B, 89, 71
See application file for complete search history.

(56) References Cited

U.S. PATENT DOCUMENTS 6,462,442 B1 * 10/2002 Braun et al. ................ 310/68 B
7,138,742 B2 * 11/2006 Arimitsu et al. ....... 310/216.057
(Continued)

FOREIGN PATENT DOCUMENTS

CN          101153793 A      4/2008
CN          101410289 A      4/2009
(Continued)

OTHER PUBLICATIONS

International Search Report for PCT/JP2010/070209 dated Dec. 7, 2010.
(Continued)

*Primary Examiner* — Naishadh Desai
(74) *Attorney, Agent, or Firm* — Sughrue Mion, PLLC; Richard C. Turner

(57) ABSTRACT

Provided is a motor for electric power steering, which prevents a foreign substance from entering the interior of a controller. The motor for electric power steering includes a resolver structure provided between a housing for separating the controller and a resolver from each other and an insulator opposed to the housing so as to surround a fixing portion for fixing base end portions of terminals electrically connected to distal end portions of conductors of coils, the resolver structure preventing a foreign substance from passing between the housing and the insulator to enter the interior of the controller.

8 Claims, 3 Drawing Sheets

(56) References Cited

U.S. PATENT DOCUMENTS

| | | | |
|---|---|---|---|
| 7,453,175 B2 * | 11/2008 | Nakanishi et al. | 310/68 B |
| 2004/0174162 A1 * | 9/2004 | Kuwahara | 324/207.25 |
| 2006/0232147 A1 * | 10/2006 | Cheng | 310/52 |
| 2008/0073987 A1 * | 3/2008 | Kataoka et al. | 310/71 |
| 2009/0295325 A1 * | 12/2009 | Sekine et al. | 318/646 |

FOREIGN PATENT DOCUMENTS

| | | |
|---|---|---|
| JP | 2000-142431 A | 5/2000 |
| JP | 2007-314060 A | 12/2007 |
| JP | 2008-104321 A | 5/2008 |
| JP | 2008-179188 A | 8/2008 |
| JP | 2009-100538 A | 5/2009 |
| JP | 4320335 B2 | 8/2009 |

OTHER PUBLICATIONS

Communication dated Nov. 21, 2014 from the State Intellectual Property Office of the People's Republic of China in counterpart application No. 201080070041.8.

* cited by examiner

MOTOR FOR ELECTRIC POWER STEERING

CROSS REFERENCE TO RELATED APPLICATIONS

This application is a National Stage of International Application No. PCT/JP2010/070209 filed Nov. 12, 2010, the contents of which are incorporated herein by reference in their entirety.

TECHNICAL FIELD

The present invention relates to a motor for electric power steering, which includes therein a controller for controlling driving of a motor main body for outputting an assist torque to a steering wheel of a vehicle.

BACKGROUND ART

Conventionally, there is known a motor for electric power steering, which includes a motor main body for outputting an assist torque to a steering wheel of a vehicle, a resolver provided to one end portion of a shaft of the motor main body, for detecting a rotational position of a rotor provided to another end portion of the shaft, a controller provided between the resolver and the motor main body so as to be shielded from the resolver, for controlling the supply of a current from a battery to the motor main body so as to control driving of the motor main body, and terminals for electrically connecting the resolver and the controller so as to transmit an output voltage from the resolver to the controller (for example, see Patent Literature 1).

CITATION LIST

Patent Literature

[PTL 1] Japanese Patent Application 2010-110351 (FIG. 2)

SUMMARY OF INVENTION

Technical Problem

In the motor for electric power steering having the configuration described above, distal end portions of the terminals pass through a partition portion, which separates the resolver and the controller from each other, so as to be electrically connected to a control board of the controller by welding. However, there is a problem in that a foreign substance is likely to pass between the partition portion and the terminals penetrating through the partition portion to enter the interior of the controller.

The present invention has been made to solve the problem described above, and therefore has an object to provide a motor for electric power steering, which prevents a foreign substance from entering the interior of a controller.

Solution to Problem

According to the present invention, there is provided a motor for electric power steering, including: a motor main body for outputting an assist torque to a steering wheel of a vehicle; a resolver provided to one end portion of a shaft of the motor main body, for detecting a rotational position of a rotor provided to another end portion of the shaft; a controller provided between the resolver and the motor main body so as to be shielded from the resolver, for controlling supply of a current from a battery mounted in the vehicle to the motor main body so as to control driving of the motor main body; and terminals for electrically connecting the resolver and the controller, for transmitting an output voltage from the resolver to the controller, the resolver including a stator core having teeth, an insulator covering the stator core, and coils wound around the teeth through the insulator, in which: the motor for electric power steering includes sealing means provided between the housing for separating the controller and the resolver from each other and the insulator opposed to the housing so as to surround a fixing portion for fixing base end portions of the terminals electrically connected to distal end portions of conductors of the coils, for preventing a foreign substance from entering interior of the controller.

Advantageous Effects of Invention

According to the motor for electric power steering of the present invention, the sealing means is provided between the housing and the insulator opposed to the housing so as to surround the fixing portion for fixing the base end portions of the terminals. Therefore, the foreign substance is prevented from passing between the housing and the insulator to enter the interior of the controller.

DESCRIPTION OF EMBODIMENTS

First Embodiment

Figure 1:
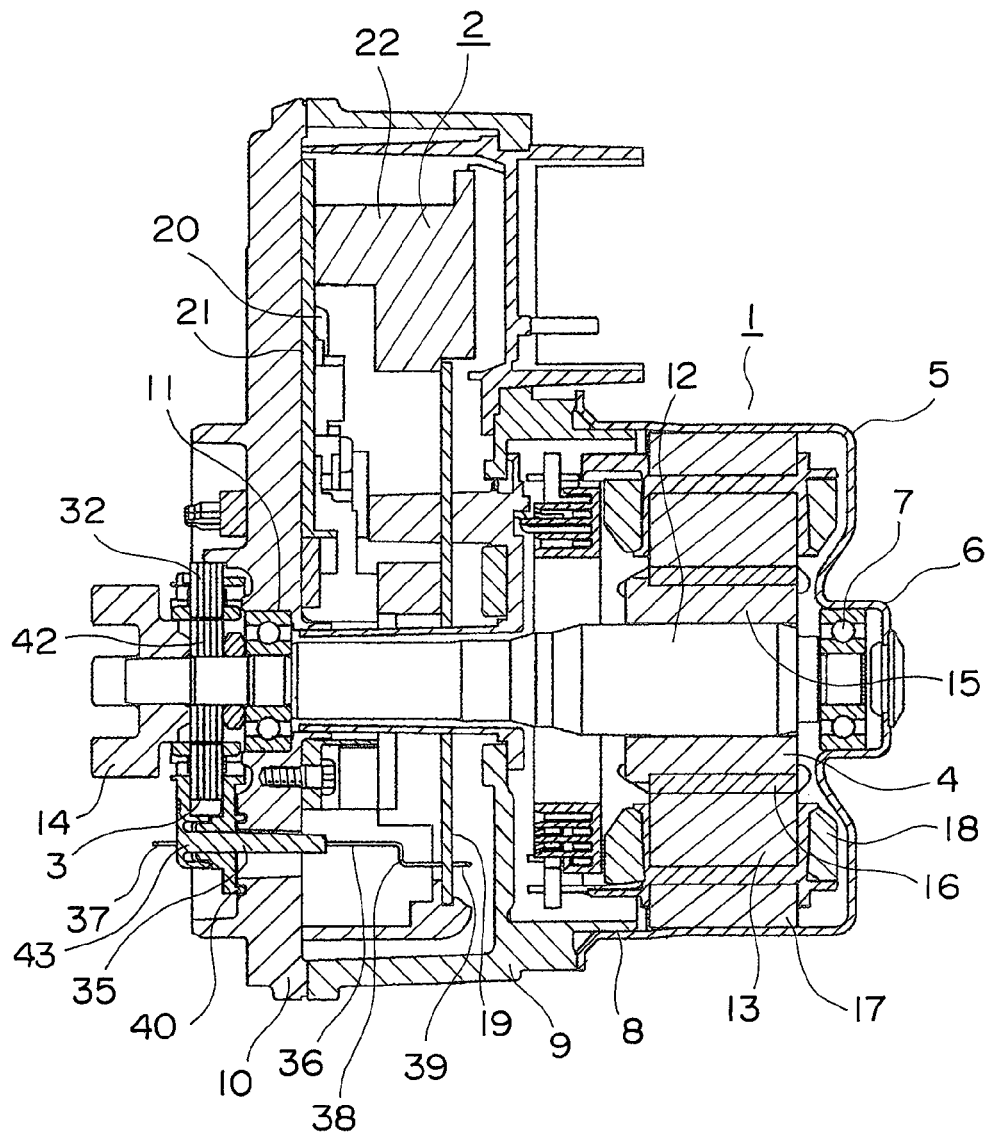
FIG. 1 A sectional side view of a motor for electric power steering according to a first embodiment of the present invention.

FIG. 1 is a sectional side view of a motor for electric power steering (hereinafter abbreviated as "motor") according to a first embodiment of the present invention.

The motor includes a motor main body 1 for outputting an assist torque to a steering wheel (not shown) of a vehicle, a controller 2 for controlling the supply of a current from a battery (not shown) mounted in a vehicle to the motor main body 1 to control driving of the motor main body 1, a resolver 3 for detecting a rotational position of a rotor 4 of the motor main body 1, and terminals 36 for electrically connecting the resolver 3 and the controller 2.

The motor main body 1, which is a three-phase brushless motor, includes a frame 5 having a cylindrical shape with a closed end, a rear bearing 7 incorporated into a rear bearing box portion 6 formed on a bottom of the frame 5, a cover 9 having a cylindrical shape, fitted to a flange portion 8 formed on an opening-side end portion of the frame 5, and a housing 10 joined to one end surface of the cover 9, for tightly sealing the controller 2 in cooperation with the cover 9.

The motor main body 1 includes a front bearing 11 pressed into the housing 10, a shaft 12 having both end portions which are rotatably supported by the front bearing 11 and the rear bearing 7, the rotor 4 fixed to the shaft 12, a stator 13 provided around the rotor 4 through a clearance (not shown) so as to be pressed into the frame 5, and a boss 14 pressed into a distal end portion of the shaft 12, which is a coupling for connection to a speed-reduction mechanism (not shown).

The rotor 4 includes a rotor core 15 and permanent magnets 16. The permanent magnets 16 are magnetized alternately to an N-pole and an S-pole.

The stator 13 includes a stator core 17 which is formed by laminating thin steel plates and has teeth (not shown) projecting toward the rotor 4, and stator windings 18 formed by winding a conductor through slots formed between the teeth.

The controller 2 described above includes a microcomputer (not shown) and the like mounted on a control board 19 made of glass epoxy, power devices 20 such as power MOS-FETs, mounted on a metal-based driving board 21, which adheres tightly to an inner wall surface of the housing 10 made of an aluminum alloy, a capacitor (not shown) for absorbing a ripple component of the current flowing through the motor main body 1, a coil (not shown) for absorbing electromagnetic noise, and a supporting portion 22 provided between the driving board 21 and the control board 19 to ensure a constant distance between the driving board 21 and the control board 19.

Figure 2:
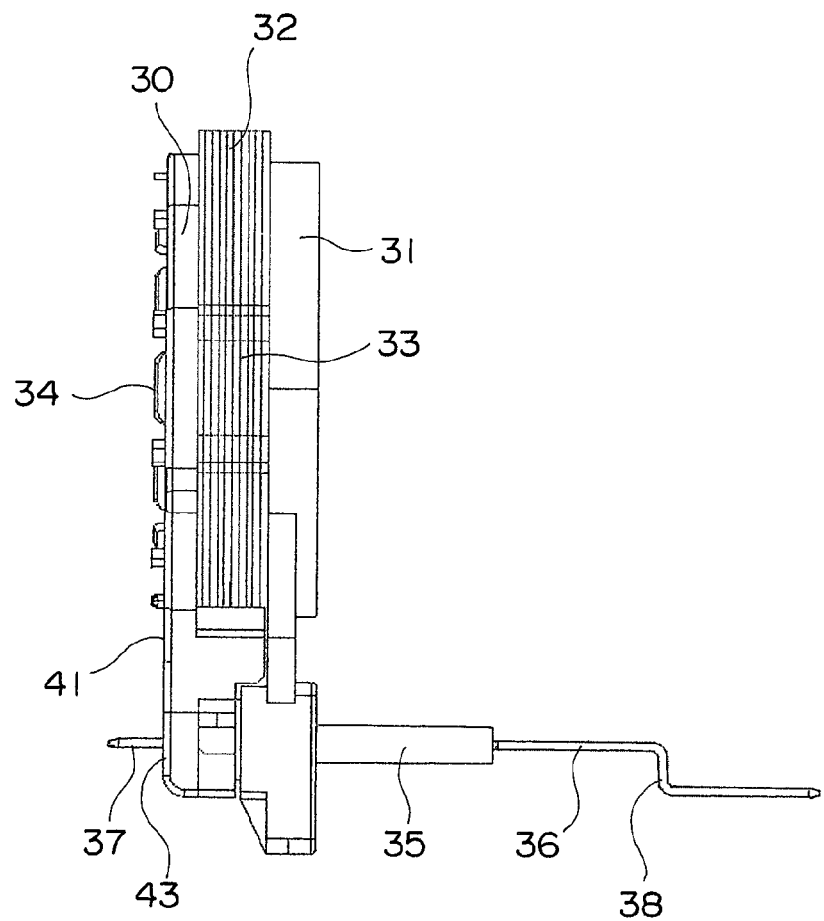
FIG. 2 A side view illustrating a resolver (from which coils are omitted) illustrated in FIG. 1.
Figure 3:
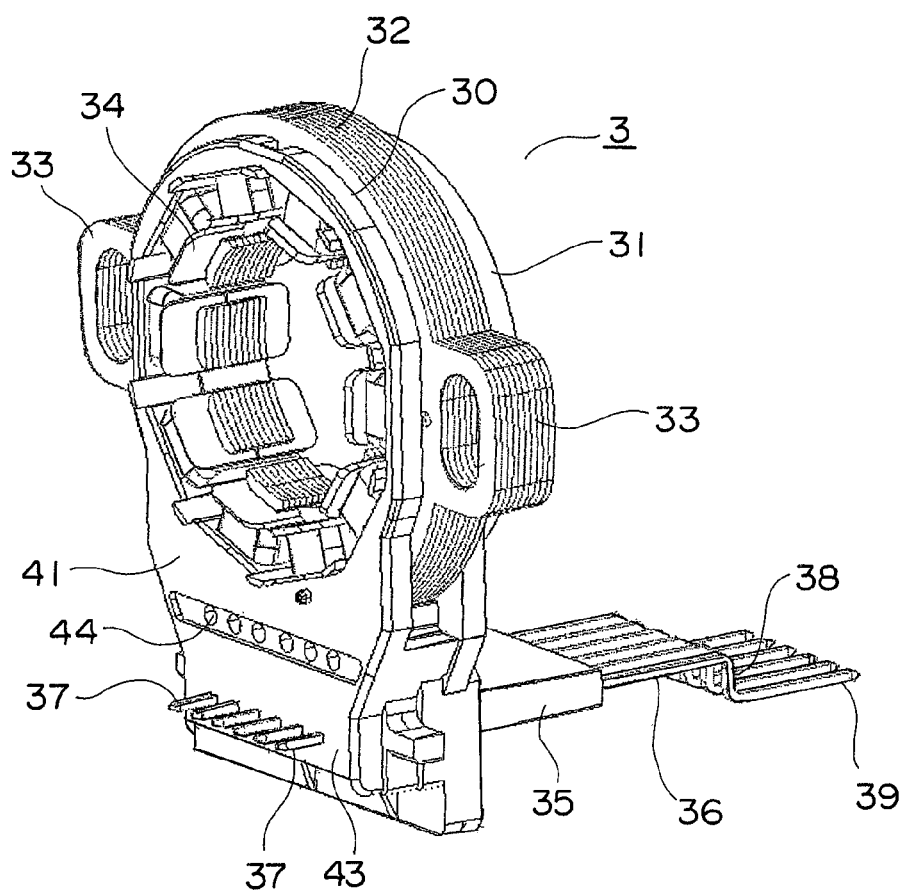
FIG. 3 A perspective view of the resolver illustrated in FIG. 2.

FIG. 2 is a side view of the resolver 3 illustrated in FIG. 1, and FIG. 3 is a perspective view of the resolver 3 illustrated in FIG. 1. The illustration of the coils is omitted.

The resolver 3 includes a stator core 32 having an annular shape, a first insulator 30 and a second insulator 31 provided on the inner side of the stator core 32 on both sides, coils (not shown) wound around the stator core 32, and a rotor 42 pressed into a smaller-diameter end portion of the shaft 12 so as to be opposed to the stator core 32.

The stator core 32 includes a plurality of teeth provided equiangularly on an inner side so as to project to the inner diameter side and ear portions 33 on both sides. The stator core 32 is fixed to the housing 10 at the ear portions 33 by using screws (not shown).

An end surface of the first insulator 30 and that of the second insulator 31 are held while being abutted with each other on the inner diameter side of the stator core 32 to form bobbins 34 covering the teeth.

In a lower portion of the first insulator 30, which is provided on the side opposite to the housing 10, a fixing portion 43 for fixing base end portions of the terminals 36 is provided. A projecting portion 35 having a distal end portion which passes through the second insulator 31 and the housing 10 to be exposed in an internal space of the controller 2 is formed on the fixing portion 43. Guiding holes (not shown) for guiding the plurality of terminals 36 toward the control board 19 are formed in the projecting portion 35.

A labyrinth structure 40 corresponding to sealing means is formed between the housing 10 and the second insulator 31 opposed to the housing 10 so as to surround the fixing portion 43.

The labyrinth structure 40 is formed by concave and convex portions formed on the housing 10 along the periphery of the fixing portion 43 and convex and concave portions formed on the second insulator 31 so as to be loosely inserted into the concave and convex portions of the housing 10.

As sealing means for preventing a foreign substance from passing between the housing 10 and the second insulator 31 to enter the interior of the controller 2, an O-ring may be provided between the housing 10 and the second insulator 31 opposed to the housing 10.

Moreover, although first insulator 30, the fixing portion 43, and the projecting portion 35 are integrally formed of a polybutylene terephthalate (PBT) resin, the first insulator, the fixing portion, and the projecting portion may be individually configured by separate components.

Distal end portions 39 of the plurality of terminals 36 pressed into the guiding holes of the projecting portion 35 are electrically connected to the control board 19 by a solder. In a middle portion of each of the terminals 36, a level-difference portion 38 is formed.

The second insulator 31, the fixing portion 43, the projecting portion 35, and each of the terminals 36 may be integrally formed by insert molding.

Distal end portions of the plurality of terminals 36 pressed into the guiding holes of the projecting portion 35 are electrically connected to the control board 19 by a solder. In a middle portion of each of the terminals 36, a level-difference portion 38 is formed.

The first insulator 30, the fixing portion 43, the projecting portion 35, and each of the terminals 36 may be integrally formed by insert molding.

The coils include a single-phase exciting coil, an Scos output coil, and an Ssin output coil.

The exciting coil is formed by electrically connecting a base end portion of a conductor to one end portion of one of terminals 37 by welding, then passing a distal end portion thereof along a surface of a transition portion 41 to be wound around each of the teeth of the stator core 32 through the bobbins 34, passing the conductor along the surface of the transition portion 41 again, and electrically connecting the distal end portion to one end portion of another of the terminals 37 by welding.

The Scos output coil and the Ssin output coil are formed in the same manner as the exciting coil, that is, by winding a conductor around each of the teeth through the bobbins 34 so that a base end portion and a distal end portion of each of the conductors are electrically connected to one end portions of different ones of the terminals 37 by welding.

The Scos output coil and the Ssin output coil are mounted to the stator core 32 after the exciting coil is mounted thereto. Therefore, the exciting coil is not visible from the outer side of the resolver 3.

An outer shape of the rotor 42 has a special curve which sinusoidally changes a radial gap permeance between the stator core 32 and the rotor 42 depending on an angle of rotation of the rotor 42.

In FIG. 3, the reference numeral 44 denotes pin holes for placing pins for guiding the respective conductors at the time of formation of the coils. The pins are removed after the formation of the coils.

Next, an operation of the motor having the configuration described above is described.

A signal of the motor current flowing through the motor main body 1, a steering-torque signal from a torque sensor (not shown), and a rotational-position signal of the rotor 42 from the resolver 3 are input to the microcomputer mounted on the control board 19.

In the resolver 3, an exciting voltage is applied to the exciting coil so that an exciting current flows through the exciting coil. As a result, a magnetic flux is generated in a gap between the rotor 42 and the stator core 32.

On the other hand, by the rotation of the rotor 42 rotating together with the rotation of the shaft 12, the radial gap permeance between the stator core 32 and the rotor 42 changes.

By the change in gap permeance, a phase difference is generated between an output-voltage waveform of the Scos output coil and that of the Ssin output coil. The output voltages are transmitted to the microcomputer mounted on the control board 19 through the terminals 36.

The microcomputer computes a current corresponding to an assist torque based on the input signals so as to output a driving signal to the power devices 20 constituting a bridge circuit through a FET driving circuit. Each of the power devices 20 is driven by the driving signal to control the current flowing through the motor main body 1.

The current controlled by the controller 2 flows through the stator windings 18. Along with a rotating field generated in the stator windings 18, the rotor 4 whose torque is controlled rotates.

Along with the rotation of the rotor 4, the shaft 12 also rotates. A worm coupled to the shaft 12 through the boss 14 and a worm wheel which is held in meshing engagement with the worm also simultaneously decelerate while a rotating direction is changed perpendicularly. In this manner, the assist torque is increased.

The assist torque moves wheels through a steering-wheel joint (not shown), a steering gear (not shown), and the like to enable a change in direction of the vehicle.

According to the motor for electric power steering, which has the configuration described above, there is provided the labyrinth structure 40 corresponding to the sealing means provided between the housing 10 which separates the controller 2 and the resolver 3 from each other and the second insulator 31 opposed to the housing 10 so as to surround the fixing portion 43 for fixing the base end portions of the terminals 36. Therefore, a foreign substance can be prevented from entering the interior of the controller 2 through the clearance between the housing 10 and the second insulator 31.

Moreover, the labyrinth structure 40 is used as the sealing means, and therefore a new member used for sealing is not required. Merely by fitting the convex and concave portions of the second insulator 31 into the concave and convex portions of the housing 10, the labyrinth structure 40 is easily formed.

Moreover, the first insulator 30 and the fixing portion 43 are integrally formed of the same PBT resin. Thus, the occurrence of disconnection of the conductors of the coils of the resolver 3, a connection defect occurring in a region where the terminals 36 and the conductors are connected, and the like, due to a thermal expansion difference generated by a difference in material between the first insulator 30 and the fixing portion 43, can be prevented.

Further, the projecting portion 35 projecting toward the controller 2 is provided to the fixing portion 43. Therefore, a shock is not directly applied to each of the terminals 36. Thus, the occurrence of disconnection and the connection defect in the region in which each of the conductors is connected to the end portion of a corresponding one of the terminals 36 and the like can be reduced.

Moreover, the guiding holes, into which the respective terminals 36 are inserted, are formed in the projecting portion 35. Therefore, each of the terminals 36 can be easily mounted to the projecting portion 35.

Further, the fixing portion 43 and the projecting portion 35 are formed integrally of the same PBT resin. Therefore, a step of assembling the projecting portion 35 to the fixing portion 43 is not required.

When the first insulator 30, the fixing portion 43, the projecting portion 35, and each of the terminals 36 are integrally formed by insert molding, a step of pressing each of the terminals 36 to the fixing portion 43 and the projecting portion 35 is not required, either. In addition, a foreign substance can be more reliably prevented from passing between each of the terminals 36 and each of the fixing portion 43 and the projecting portion 35 to enter the interior of the controller.

Further, the level-difference portion 38 is formed in the middle portion of each of the terminals 36. Therefore, a stress on each of the terminals 36 due to a difference in thermal expansion between the components such as the control board 19 and the projecting portion 35, which is generated with a change in temperature, is absorbed by the level-difference portion 38. As a result, the occurrence of disconnection and a connection defect in the region where the conductors are connected to the end portions of the terminals 36 and a connection defect between the distal end portions of the terminals 36 and the control board 19 can be reduced.

REFERENCE SIGNS LIST 1 motor main body, 2 controller, 3 resolver, 4 rotor, 5 frame, 6 rear bearing box portion, 7 rear bearing, 8 flange portion, 9 cover, 10 housing, 11 front bearing, 12 shaft, 13 stator, 14 boss, 15 rotor core, 16 permanent magnet, 17 stator core, 18 stator winding, 19 control board, 20 power device, 21 driving board, 22 supporting portion, 23 base, 30 first insulator, 31 second insulator, 32 stator core, 33 ear portion, 34 bobbin, 35 projecting portion, 36 terminal, 37 terminal, 38 level-difference portion, 39 distal end portion, 39 distal end portion, 40 labyrinth structure, 41 transition portion, 42 fixing portion, 43 rotor, 44 pin hole.

The invention claimed is:

1. A motor for electric power steering, comprising:
   a motor main body for outputting an assist torque to a steering wheel of a vehicle;
   a resolver provided to one end portion of a shaft of the motor main body, for detecting a rotational position of a rotor provided to another end portion of the shaft;
   a controller provided between the resolver and the motor main body so as to be shielded from the resolver, for controlling supply of a current from a battery mounted in the vehicle to the motor main body so as to control driving of the motor main body; and
   terminals for electrically connecting the resolver and the controller, for transmitting an output voltage from the resolver to the controller,
   the resolver including a stator core having teeth, an insulator covering the stator core, and coils wound around the teeth through the insulator,
   wherein the motor includes a sealing means that is provided between a housing separating the controller from the resolver and the insulator that is opposed to the housing, and that surrounds a fixing portion for fixing base end portions of the terminals, for preventing a foreign substance from entering an interior of the controller.

2. The motor for electric power steering motor according to claim 1, wherein the insulator and the fixing portion are formed integrally of the same resin.

3. The motor for electric power steering motor according to claim 2, wherein the fixing portion is provided with a projecting portion projecting toward the controller.

4. The motor for electric power steering motor according to claim 3, wherein the fixing portion and the projecting portion are formed integrally of the same resin.

5. The motor for electric power steering motor according to claim 1, wherein a level-difference portion is formed in a middle portion of each of the terminals.

6. The motor for electric power steering motor according to claim 1, wherein the sealing means is a labyrinth structure.

7. The motor of claim 1, wherein the terminals are electrically connected to distal end portions of conductors of the coils.

8. The motor of claim 1, wherein the housing and the insulator include concave and convex portions, and wherein the sealing means are loosely inserted into the concave and convex portions of the housing and the insulator.

* * * * *